United States Patent [19]
Knosp et al.

[11] Patent Number: 5,626,987
[45] Date of Patent: May 6, 1997

[54] HYDRIDABLE MATERIAL FOR THE NEGATIVE ELECTRODE IN A NICKEL-METAL HYDRIDE STORAGE BATTERY

[75] Inventors: Bernard Knosp, Neuilly-sur-Seine; Jacques Bouet, Paris; Christian Jordy, Dourdan; Michel Mimoun, Neuilly-sur-Marne; Daniel Gicquel, Lanorville, all of France

[73] Assignee: SAFT, Romainville, France

[21] Appl. No.: 421,783

[22] Filed: Apr. 14, 1995

[30] Foreign Application Priority Data

Apr. 15, 1994 [FR] France .................... 94 04555

[51] Int. Cl.$^6$ .................... H01M 4/02
[52] U.S. Cl. .................... 429/218; 429/59; 429/101; 429/223; 429/224; 420/449; 420/451; 420/459; 420/480; 420/588; 420/900
[58] Field of Search .................... 429/59, 101, 218, 429/223, 224, 233; 420/449, 451, 459, 480, 588, 900

[56] References Cited

U.S. PATENT DOCUMENTS

| | | | |
|---|---|---|---|
| 5,278,001 | 1/1994 | Ono et al. | 429/101 |
| 5,384,209 | 1/1995 | Bouet et al. | 429/59 |

FOREIGN PATENT DOCUMENTS

| | | |
|---|---|---|
| 0484964A1 | 5/1992 | European Pat. Off. . |
| 0552790A1 | 7/1993 | European Pat. Off. . |
| 0587503A1 | 3/1994 | European Pat. Off. . |
| 2623271 | 5/1989 | France . |
| 2623271A1 | 5/1989 | France . |
| 2628121A1 | 9/1989 | France . |

*Primary Examiner*—M. Nuzzolillo
*Attorney, Agent, or Firm*—Sughrue, Mion, Zinn, Macpeak & Seas

[57] ABSTRACT

A monophase hydridable material for the negative electrode of a nickel-metal hydride storage battery with a "Lavé's phase" structure of hexagonal C14 type (MgZn$_2$) has the general formula:

$$Zr_{1-x}Ti_xNi_aMn_bAl_cCo_dV_e$$

where $0.036 \leq x \leq 0.456$     $0.7 \leq a \leq 0.9$
$0.8 \leq a+e \leq 1.2$     $0.7 \leq b \leq 0.9$
$0.8 \leq b+c+d \leq 1.2$     $0 \leq c \leq 0.2$
$1.9 \leq a+b+c+d+e \leq 2.1$     $0.1 \leq d \leq 0.2$
    $0.05 \leq e \leq 0.3$

4 Claims, 1 Drawing Sheet

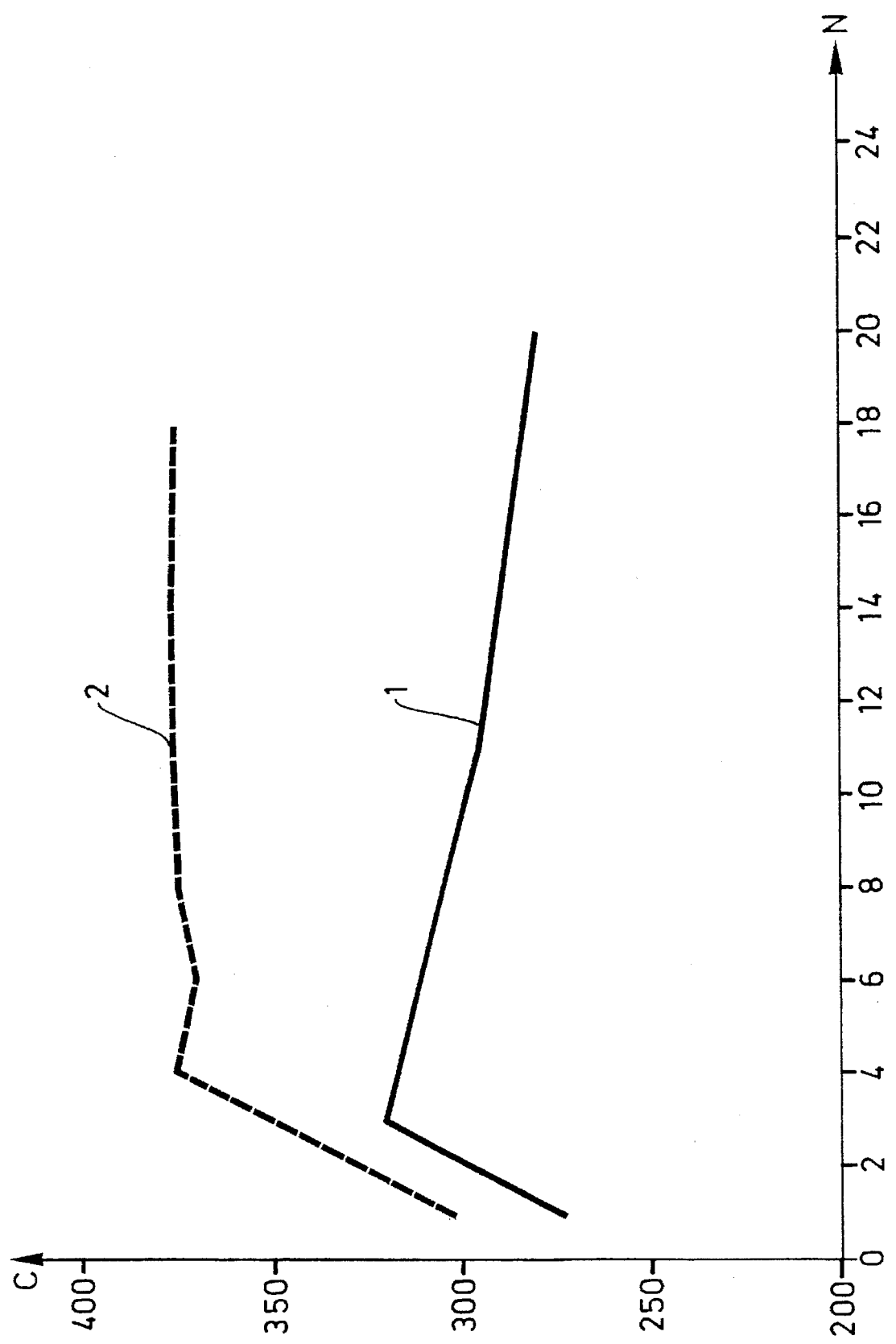

HYDRIDABLE MATERIAL FOR THE NEGATIVE ELECTRODE IN A NICKEL-METAL HYDRIDE STORAGE BATTERY

BACKGROUND OF THE INVENTION

1. Field of the Invention

The present invention concerns a hydridable material for the negative electrode in a nickel-metal hydride storage battery. It also concerns the use of this material in the negative electrode of a nickel-metal hydride storage battery.

2. Description of the Prior Art

Sealed nickel-metal hydride storage batteries are alkaline storage batteries with aqueous electrolytes; the reactant constituted by the hydrogen is stored in the mass of the hydridable alloy which has the ability to absorb hydrogen in large quantities. This alloy must be able to store and give up the hydrogen depending on whether the storage battery is being charged or discharged, at a rate which is adequate for normal operating conditions. It must also have a high electrochemical capacity, resist corrosion in the potassium hydroxide and be non-toxic.

A great deal of work has been carried out on intermetallic $AB_2$ type compounds known as "Lavé's phases". These phases are classified into three crystalline structures, cubic C15 ($MgCu_2$ type), hexagonal C14 ($MgZn_2$), and hexagonal C36 ($MgNi_2$). The latter symmetry is little used. These phases can be obtained from $ZrCr_2$ and $ZrV_2$ systems and from $TiMn_x$, $HfMn_x$ and $ZrMn_x$ systems where x is between 1.5 and 2.5. These materials, however, are difficult to use industrially due to acute oxidizability in air, corrosion in the electrolyte and passivation during use in an electrode.

European patent application EP-A-0 587 503 describes a family of hydridable materials comprising a major phase with a C14 structure and general formula:

$$(Zr_{1-a}A_a)(Ni_{1-(b+c+d+e)}Mn_bAl_cCo_dM_e)_t$$

where $0 \leq a \leq 0.3$    $0 < b \leq 0.6$ $1.9 \leq t \leq 2.1$    $0 < c \leq 0.4$ $b+c+d+e \leq 0.8$    $0 < d \leq 0.4$ $0 \leq e \leq 0.6$ where A represents at least one element selected from Ti, Y, Ce, Ca and Mg and M is selected from Cr and Si.

While these materials have a relatively high capacity, the majority of them are difficult to charge and discharge quickly with satisfactory performance. In addition, multiphase materials are vulnerable to corrosion due to the phenomenon of localized micro-cells, which reduces the performance on cycling.

The present invention particularly concerns a hydridable electrode material which can be charged and discharged quickly in satisfactory fashion.

SUMMARY OF THE INVENTION

The invention thus consists in a hydridable material for the negative electrode of a nickel-metal hydride storage battery with a "Lavé's phase" structure of hexagonal C14 type ($MgZn_2$), characterized in that it is a monophase with general formula:

$$Zr_{1-x}Ti_xNi_aMn_bAl_cCo_dV_e$$

where:

$0.036 \leq x \leq 0.456$    $0.7 \leq a \leq 0.9$ $0.8 \leq a+e \leq 1.2$    $0.7 \leq b \leq 0.9$ $0.8 \leq b+c+d \leq 1.2$    $0 \leq c \leq 0.2$ $1.9 \leq a+b+c+d+e \leq 2.1$    $0.1 \leq d \leq 0.2$ $0.05 \leq e \leq 0.3$ such that the alloy has a Mn/Ni ratio of between 0.77 and 1.29.

The material of the present invention can in one hour either recharge to 75% before the onset of release of hydrogen or discharge more than 90% of its capacity per unit mass measured at normal rates (discharge in 5 hours). With a very high rate of discharge, more than 75% of the capacity measured under normal conditions can be discharged in 30 minutes.

The material of the invention reaches capacity in three cycles and its performance is practically stable throughout its lifetime. This is of great advantage to the user who quickly obtains the maximum performance of the cell and profits therefrom during the whole of the rated service period.

In a first embodiment, the material has formula:

$$Zr_{0.82}Ti_{0.18}Ni_{0.8}Mn_{0.08}Co_{0.15}V_{0.25}$$

In a second embodiment, the material has formula:

$$Zr_{0.8}Ti_{0.2}Ni_{0.8}Mn_{0.8}Al_{0.05}Co_{0.15}V_{0.2}$$

In a third embodiment, the material has formula:

$$Zr_{0.75}Ti_{0.25}Ni_{0.8}Mn_{0.8}Al_{0.15}Co_{0.15}V_{0.1}$$

The present invention also consists in a negative electrode for a nickel-metal hydride storage battery comprising a hydridable material which is formed from a mixture composed of a powdered hydridable material, 0.1% to 70% of a conductive powder and 0.05% to 5% of an organic binder, fixed to a conductive support. An electrode comprising a current collector in which the hydridable alloy is adhered by thermal sintering could also be used, of course. The current collector can, for example, be a perforated strip, a grid, an expanded sheet, a felt or a foam. Additives, for example an organic binder, can be added to aid fixing of the alloy on the collector, its sintering or its electrochemical operation.

The material of the invention lends itself to a number of applications due to its fast chargeability and fast dischargeability, and is therefore particularly well suited to applications in the fields of transport and portable equipment.

Other features and advantages of the present invention will become clear from the following examples and embodiments, which are given by way of illustration and are not in any. Way limiting, and from the accompanying drawing.

BRIEF DESCRIPTION OF THE DRAWING

The single FIGURE of the drawing shows the discharge capacity during cycling of an electrode comprising the alloy $Zr_{0.7}Ti_{0.3}Ni_{0.8}Mn_{0.8}Al_{0.25}Co_{0.15}$ of the prior art and the discharge capacity during cycling of an electrode comprising the alloy of the present invention with composition $Zr_{0.8}Ti_{0.2}Ni_{0.8}Mn_{0.8}Al_{0.05}Co_{0.15}V_{0.2}$. The ordinate C represents the capacity of the hydridable alloy in mAh/g and the abscissa N represents the number of cycles.

DETAILED DESCRIPTION OF THE INVENTION

EXAMPLE 1 (Prior art)

A prior art alloy with composition $Zr_{0.7}Ti_{0.3}Ni_{0.8}Mn_{0.8}Al_{0.25}Co_{0.15}$ was produced from a mixture formed from high purity metals (99.5% to 99.999%), then this mixture was homogenized by several successive melting steps in an induction furnace equipped with a water-cooled copper crucible, in a partial pressure of argon.

Radiocrystallographic analysis of the alloy obtained and reduced to a powder by mechanical grinding in argon showed that most of this biphase alloy was constituted by a hexagonal "Laves phase" with a C14 structure ($MgZn_2$) and lattice parameters a=0.4984 nm and c=0.8117 run, with at least 5% of another phase.

An electrode was then formed in which the active material was composed of 25% of the hydridable alloy produced above reduced to a powder by successive hydriding/dehydriding cycles, 70% of a nickel powder and 5% of a PTFE-based organic binder. The active material was supported on an expanded nickel current collector. Once formed, the electrode was compressed at a pressure of 10 tonnes/cm$^2$. This electrode was then precharged at 80 mAh and heat treated to activate it for 3 hours at 70° C.

This electrode was assembled in an open cell, opposite a nickel hydroxide positive electrode analogous to that used in conventional nickel-cadmium storage batteries. The electrolyte was 8.7N potassium hydroxide, KOH; an excess was introduced.

Electrochemical evaluation of the electrode was carried out by testing under the following conditions:

charging at a current of 40 mA per gram of hydridable alloy for 16 hours, discharging at 80 mA/g up to an end-point voltage of 0.95 volt.

Curve 1 in the single figure represents cycling under these conditions using the electrode formed as described above. After three cycles the maximum capacity per unit mass restored during the main discharge was 320 mAh per gram of hydridable alloy. It decreased regularly up to cycle 20.

During discharge at a current of 400 mA/g the material discharged a capacity per unit mass of 260 mAh/g, i.e. 81% of its capacity at normal rates.

During discharge at a current of 800 mA/g the material discharged a capacity per unit mass of 122 mAh/g, i.e. 38% of its capacity at normal rates.

A similar electrode to that formed as described above was assembled in a sealed cell under argon equipped with a pressure sensor and three cycles were carried out under the charging and discharging conditions given above.

After the discharge of the third cycle, the cell was recharged at a current of 400 mA/g. Release of hydrogen detected by the pressure increase in the cell, started after charging to a capacity per unit mass of 207 mAh/g.

EXAMPLE 2

An electrode was formed as described in Example 1, this time using the $Zr_{0.8}Ti_{0.2}Ni_{0.8}Mn_{0.8}Al_{0.05}Co_{0.15}V_{0.2}$ alloy of the invention produced from high purity metals (99.5% to 99.999%), then this mixture was homogenized by several successive melting steps in an induction furnace equipped with a water-cooled copper crucible and a partial pressure of argon. After the final melting step, the alloy was vacuum annealed for at least 24 hours at 1100° C.

Radiocrystallographic analysis showed that this monophase alloy was constituted by a "Lavé's phase" with a C14 structure ($MgZn_2$) and lattice parameters a=0.4992 nm and c=0.8139 nm.

This electrode was then evaluated under the conditions described for Example 1.

Curve 2 in the single figure shows that a capacity per unit mass of 376 mAh/g was attained after three cycles during discharge at normal rates. It remained stable for 18 cycles.

During discharge at a current of 400 mA/g the material discharged a capacity per unit mass of 347 mAh/g, i.e. 92% of its capacity at normal rates.

During discharge at a current of 800 mA/g the material discharged a capacity per unit mass of 296 mAh/g, i.e. 79% of its capacity at normal rates.

A similar electrode to that formed as described above was assembled in a sealed cell under argon equipped with a pressure sensor and three cycles were carried out under the charging and discharging conditions given in Example 1.

After the third cycle the cell was recharged at a current of 400 mA/g. Release of hydrogen, detected by the pressure increase in the cell, started after charging to a capacity per unit mass of 281 mAh/g, representing an improvement of more than 35% over the prior art.

EXAMPLE 3

An electrode was formed as described in Example 1, this time using the $Zr_{0.82}Ti_{0.18}Ni_{0.8}Mn_{0.8}Co_{0.15}V_{0.25}$ alloy of the invention formed as described in Example 2.

Radiocrystallographic analysis showed that this monophase alloy was constituted by a "Lavé's" with a C14 structure and lattice parameters a=0.4994 nm and c=0.8146 nm.

This electrode was then evaluated under the conditions described for Example 1.

During discharge at normal rates (80 mA/g), after the third cycle a capacity per unit mass of 361 mAh/g of the alloy was discharged.

During discharge at a current of 400 mA/g the material discharged a capacity per unit mass of 321 mAh/g, i.e. 89% of its capacity at normal rates.

During discharge at a current of 800 mA/g the material discharged a capacity per unit mass of 303 mAh/g, i.e. 84% of its capacity at normal rates.

The various numerical examples of applications have been provided by way of non-limiting illustration. The present invention is not limited to the embodiments described, but can be varied by the person skilled in the art without departing from the scope of the invention. In particular, the compositions can be varied within the limits indicated without departing from the scope of the invention.

There is claimed:

1. A hydridable material for the negative electrode of a nickel-metal hydride storage battery consisting of a monophase alloy with a structure of hexagonal C14 type (Lavés phase), and a general formula:

where:

$0.036 \leq x \leq 0.456$ $0.8 \leq a+e \leq 1.2$ $0.8 \leq b+c+d \leq 1.2$ $1.9 \leq a+b+c+d+e \leq 2.1$ $0.77 \leq b/a \leq 1.29$ $0.7 \leq a \leq 0.9$ $0.7 \leq b \leq 0.9$ $0 \leq c \leq 0.2$ $0.1 \leq d \leq 0.2$ $0.05 \leq e \leq 0.3$.

2. A material according to claim 1 with formula $Zr_{0.82}Ti_{0.18}Ni_{0.8}Mn_{0.8}Co_{0.15}V_{0.25}$.

3. A material according to claim 1 with formula $Zr_{0.8}Ti_{0.2}Ni_{0.8}Mn_{0.8}Al_{0.05}Co_{0.15}V_{0.2}$.

4. A negative electrode for a nickel-metal hydride storage battery comprising a hydridable material according to claim 1 formed from a mixture composed of said hydridable material in powder for 0.1% to 70% of a conductive powder and 0.05% to 5% of an organic binder fixed on a conductive support.

* * * * *

UNITED STATES PATENT AND TRADEMARK OFFICE
CERTIFICATE OF CORRECTION

PATENT NO.: 5,626,987
DATED: May 6, 1997
INVENTOR(S): Bernard Knosp, Jacques Bouet, Christian Jordy, Michel Mimoun, and Daniel Gicquel It is certified that error(s) appears in the above-identified patent and that said Letters Patent is hereby corrected as shown below:

Column 1, after the "Title of the Invention", but before the "Background of the Invention", insert --The Government of the United States of America has rights in this invention pursuant to Cooperative Agreement No. DE-FC02-91CE50336 awarded by the U.S. Department of Energy--.

Signed and Sealed this

Twenty-seventh Day of March, 2001

*Attest:*

NICHOLAS P. GODICI

*Attesting Officer*   *Acting Director of the United States Patent and Trademark Office*